United States Patent [19]

Freeman

[11] 4,034,943

[45] July 12, 1977

[54] WELDER'S SQUARE SUPPORTING ASSEMBLY

[76] Inventor: James F. Freeman, 4344 Greenbrier Road, Long Beach, Calif. 90808

[21] Appl. No.: 706,807

[22] Filed: July 19, 1976

[51] Int. Cl.² .................. B43L 7/00; B31L 7/00
[52] U.S. Cl. ............................ 248/1; 33/112
[58] Field of Search ............... 248/1, 316 D; 33/89, 33/90, 96, 112; 24/81 CC, 255 S, 255 R, 255 FC, 255 C

[56] References Cited

U.S. PATENT DOCUMENTS

| 351,820 | 11/1886 | Ward | 33/112 |
|---|---|---|---|
| 407,285 | 7/1889 | Ensminger | 33/96 |
| 1,022,219 | 4/1912 | Woods | 33/112 |
| 1,282,375 | 10/1918 | Burda | 33/112 |
| 1,510,219 | 9/1924 | Harding | 33/112 X |
| 2,461,783 | 2/1949 | Stark | 33/90 X |
| 2,797,487 | 7/1957 | Mayer | 33/112 |
| 3,067,518 | 12/1962 | Herman | 33/112 |

*Primary Examiner*—J. Franklin Foss
*Attorney, Agent, or Firm*—William C. Babcock

[57] ABSTRACT

An assembly capable of removably engaging a first leg of a welder's square, and supporting the welder's square on a substantially horizontal pipe or structural member, with the second leg of the welder's square normally disposed to the longitudinal center line of the pipe or structural member. When the welder's square and assembly are so mounted as a unit on the pipe, the second leg may be used to align a flange relative to an end of the pipe, determine whether an end edge of the pipe is normal to the longitudinal center line of the pipe, and indicate a transverse cutting line on the pipe. Two of the units when disposed back-to-back may be used to longitudinally align two lengths of pipe that have adjacent ends thereof in abutting contact. The assembly may be used to support a welder's square on a substantially horizontal structural member, such as a channel or eye beam, to achieve like results.

2 Claims, 10 Drawing Figures

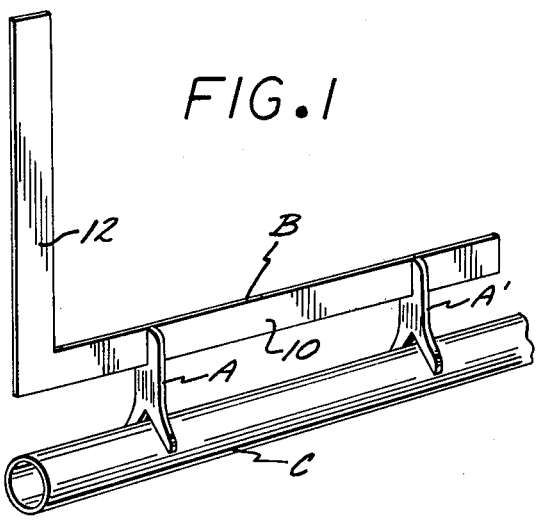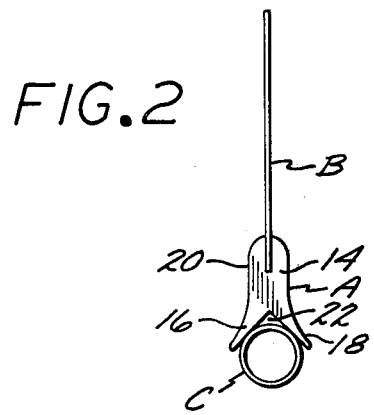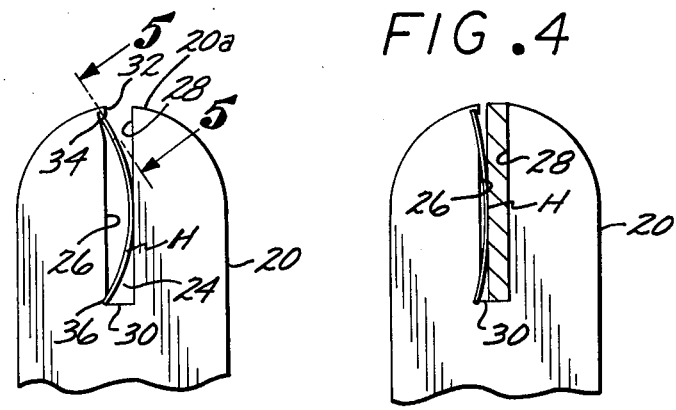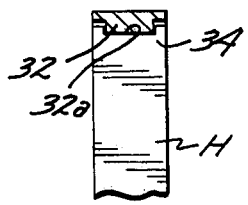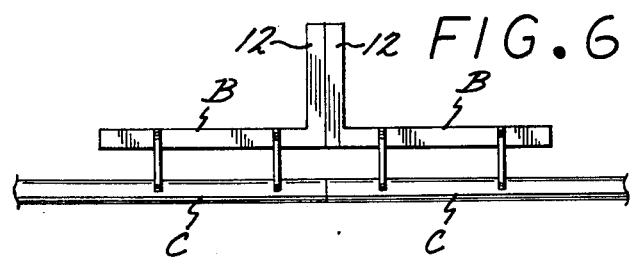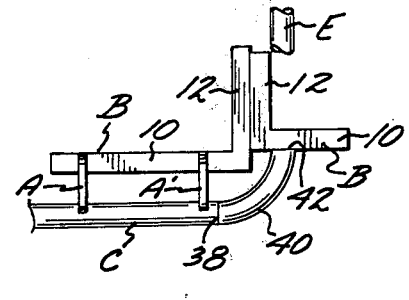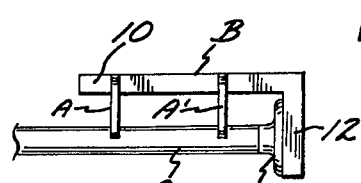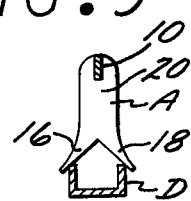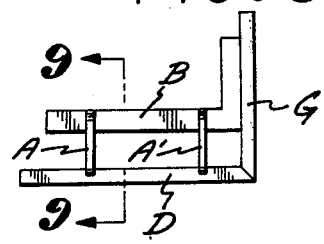

WELDER'S SQUARE SUPPORTING ASSEMBLY

BACKGROUND OF THE INVENTION

1. Field of the Invention

Welder's Square Supporting Assembly.

2. Description of the Prior Art

In the welding of pipe, a welder's square that has first and second normally disposed legs used to align a flange relative to a free end edge of the pipe, to determine a transverse cutting line normal to the longitudinal axis of the pipe, and to determine whether an end edge of the pipe is normal to the longitudinal center line of the latter. Also, pairs of the welder's square may be used back-to-back to longitudinally align two lengths of pipe that have adjacently disposed end edges. A welder's square may also be used for like purposes on structural members such as channels and eye beams.

The operational disadvantage in so using a welder's square, is that, it requires two persons, with one person holding the square, and the other performing the welding operation.

A major object of the present invention is to supply an assembly that may removably engage a first leg of a welder's square, and the square and assembly capable of being supported as a unit on a horizontally disposed length of pipe or structural member to perform the functions previously derived by the use of a welder's square, but without requiring a second person to hold the welder's square in place during the welding operation.

A major object of the present invention is to provide an assembly that may removably engage a first leg of a welder's square at any one of a number of of longitudinally spaced position thereon, with the assembly and welder's square thereafter capable of being used as a unit to be mounted on a horizontally disposed length of pipe to align a flange with a free end of the pipe, to indicate a transverse cutting line on the pipe normally disposed to the longitudinal axis thereof.

A major object of the present invention is to provide an assembly that can removably engage a first leg of a welder's square is desired longitudinal positions thereon to permit the welder's square and assembly to be mounted as a self-supporting unit on a substantially horizontal pipe or structural member for a welder by himself only to align a flange relative to the pipe, determine whether end edges of the pipe or structural member are normal to the longitudinal axis thereof, and to determine transverse cutting lines, as well as using the units in pairs back-to-back to longitudinally align two lengths of pipe that have free end edges thereof in abutting contact.

SUMMARY OF THE INVENTION

A pair of supports that may removably engage a first leg of a welder's square to permit the welder's square and supports to be mounted on a horizontal length of pipe, with the second leg of the welder's square normally disposed to the longitudinal center line of the pipe. Each of the supports is of indentical structure, and may be formed from a suitable metal such as aluminum or magnesium that is relatively light, or a suitable plastic. Each of the supports includes a body that defines first and second angularly disposed arms that have a V-shaped space therebetween, and the first and second legs frictionally engaging transversely spaced sections of the upper portion of a pipe or structural member. The body includes a third upwardly extending arm that has a slot extending downwardly therein from the upper extremity thereof. The slot is defined by first and second side walls and a bottom.

The first side wall has a protuberance that extends from the upper portion thereof towards the second side wall. An elongate resilient spring is disposed in the slot, with the spring of such length that it assumes a bowed configuration when a first end of the spring is in engagement with the bottom and the second end in abutting contact with the protuberance. The distance between the bowed center portion of the spring and the second side wall is less than the thickness of the first leg of the welder's square. Due to the structure of the support it may removably engage a desired transverse section of the first leg of a welder's square when the section is frictionally engaged by the bowed center portion of the spring and the second side wall. When two of the supports are in engagement with a first leg of a welder's square, the supports and welder's square may be removably mounted on a horizontal pipe or structural member, with the second leg of the welder's square normally disposed relative to the longitudinal axis of the pipe or structural member. The unit when so mounted is self-supporting and permits a welder to carry out welding operations by himself that previously required the services of a second person.

BRIEF DESCRIPTION OF THE DRAWING

FIG. 1 is a perspective view of the assembly in engagement with a welder's square, and the assembly and welder's square mounted as a self-supporting unit on the upper portion of a substantially horizontal pipe;

FIG. 2 is an end elevational view of the unit and pipe shown in FIG. 1;

FIG. 3 is a fragmentary side elevational view of a third arm of one of the supports prior to the latter engaging a first leg of a welder's square;

FIG. 4 is the same view as shown in FIG. 3 but with the leg removably engaging a transverse section of the welder's square;

FIG. 5 is a fragmentary cross-sectional view of a portion of the third arm and spring taken on the line 5—5 of FIG. 3;

FIG. 6 is a side elevational view of two of the units disposed back-to-back to longitudinally align two lengths of pipe that have end edges thereof in abutting contact;

FIG. 7 is a side elevational view of a unit mounted on a length of pipe and being used to align a flange prior to the latter being welded to an end of the pipe;

FIG. 8 is a side elevational view of the unit being used to align first and second structural members normal to one another;

FIG. 9 is a combined transverse cross-sectional and side elevational view of a structural member and a support taken on the line 9—9 of FIG. 8; and FIG. 10 is a side elevational view of a unit mounted on a horizontal first pipe and illustrating how a second welder's square may be used therewith to so align a 90° tee that when the latter is welded to a free end of the first pipe a second pipe may be welded to the tee in a vertical position.

DESCRIPTION OF THE PREFERRED EMBODIMENT

The assembly that holds a welder's square B on the upper portion of a substantially horizontal pipe C or structural member D includes two supports A and A' of identical structure. The welder's square B is formed from a heavy rigid metallic sheet and includes first and second legs 10 and 12 normally disposed to one another. The supports A and A' removably engage the first leg 10 at desired longitudinal positions thereon, and hold the welder's square B without assistance from the pipe C with the second leg extending either upwardly as shown in FIG. 1 or downwardly as illustrated in FIG. 7. The welder's square B when so disposed has the second leg 12 situated normal to the longitudinal axis E of pipe C or structural member D.

The supports A and A' are of identical structure and accordingly only support A will be described in detail. The support A includes a rigid body 14 that defines first and second arms 16 and 18 that are angularly disposed relative to one another, and have a triangular shaped space 22 therebetween. The adjacent sides of the first and second arms 12 and 18 frictionally engage transversely spaced sections of the pipe C or structural member D when the support A is mounted on an upper portion thereof as shown in FIGS. 1 and 8.

Body 14 includes a third upwardly extending leg 20 that has an elongate slot 24 extending downwardly in the upper portion 20a thereof as shown in detail in FIGS. 3 and 4.

Slot 24 is defined by first and second laterally spaced side walls 26 and 28 and a bottom 30. A centered protuberance 32 extends from the upper extremity of first side wall 26 towards second side wall 28. Protuberance 32 is of less width than the first side wall 26.

An elongate resilient spring H is provided that has a first end 34 and second end 36. The spring H is of sufficient length that it assumes a bowed configuration when disposed in slot 34, with first end 34 in contact with the bottom 30, and second end 36 abutting against protuberance 32. Second end 36 preferably has a recess 36a formed therein that engages protuberance 32 to prevent spring H being inadvertently displaced from slot 24. Spring H is preferably of such length that the bowed center portion contacts second side wall 28.

The supports A and A' may removably engage desired longitudinally spaced transverse sections of the first leg 10 when these sections are disposed between spring H and second side wall 28 as shown in FIGS. 1, 2 3 and 4. The supports A and A' when so engaging the welder's square B provide a self-supporting unit that may be mounted on the pipe C to align a flange F, or to align a structural member G relative to a structural member D as illustrated in FIG. 8. Two of the units may be placed back-to-back as shown in FIG. 6 to longitudinally align two lengths of pipe C that have ends thereof in abutting contact as shown in FIG. 6.

When the supports and A' are not in use they are removed from first leg, and may thereafter be disposed side by side to be carried in a compact relationship until again needed.

In FIG. 10 it will be seen that a unit comprising a first welder's square B and two supports A and A' is mounted on a horizontal pipe C adjacent a free end 38 thereof. A second hand held welder's square B may then be used with the first welder's square B to so align a 90° tubular tee 40 that when the latter is welded to the free end 38 of the horizontal pipe C that a vertical pipe H may be welded to the free end 42 of tee 40.

The use and operation of the invention, as well as the structure thereof, have been explained previously in detail and need not be repeated.

I claim:

1. An assembly for removably engaging a first leg of a welder's square in such a manner that a second leg of said welder's square is normally disposed to the longitudinal axis of a substantially horizontal elongate member when said assembly rests on an upwardly disposed portion thereof, said assembly including first and second supports of identical structure that can removably engage said first leg at desired longitudinal spacing thereon, each of said supports including:
   a. a generally Y-shaped body that has first, second and third arms, said first and second arms adjacently disposed and defining a triangular space therebetween that is partially occupied by a transverse section of said elongate member when said first and second arms rest on transversely spaced sections of the outer surface of the latter, with said third arm substantially vertically disposed, said third arm having a slot extending downwardly therein from the upper extremity thereof, said slot defined by first and second transversely spaced side walls that are parallel to the longitudinal axis of said elongate member on which said support is mounted, said slot having a bottom that extends between said first and second side walls, and said body including a protuberance that extends from the upper extremity of said first side wall towards said second wall; and
   b. a resilient elongate spring disposed in said slot, said spring having first and second ends, said first end in contact with said bottom, said second end in contact with said protuberance, and said spring of sufficient length as to assume a bowed configuration in said slot, and said spring and second side wall frictionally engaging a transverse section of said second leg to support said welders square from said support.

2. An assembly as defined in claim 1 in which said protuberance is centered on said first side wall and is of less width than the latter, and said spring has a recess in said second end that engages said protuberance to prevent said spring being inadvertently displaced from said slot.

* * * * *